United States Patent [19]

Segal

[11] Patent Number: 6,070,193
[45] Date of Patent: May 30, 2000

[54] APPARATUS AND METHOD FOR ORDERED TRANSMISSION ON NETWORKS

[75] Inventor: Edward Robert Segal, White Plains, N.Y.

[73] Assignee: International Business Machines Corp., Armonk, N.Y.

[21] Appl. No.: 08/979,037

[22] Filed: Nov. 26, 1997

[51] Int. Cl.[7] .................................................. G06F 15/16
[52] U.S. Cl. .......................... 709/229; 709/226; 709/227; 709/228; 370/397
[58] Field of Search .................................... 370/447, 397; 710/43; 709/103, 207, 240, 226–229

[56] References Cited

U.S. PATENT DOCUMENTS

| | | | |
|---|---|---|---|
| 3,996,561 | 12/1976 | Kowal et al. | 710/43 |
| 4,063,220 | 12/1977 | Metcalfe et al. | 340/825.5 |
| 4,560,985 | 12/1985 | Strecker et al. | 370/447 |
| 5,450,594 | 9/1995 | Aden et al. | 709/225 |
| 5,668,811 | 9/1997 | Worsley et al. | 370/424 |
| 6,003,086 | 12/1999 | Mitsutake et al. | 709/229 |

*Primary Examiner*—Ahmad F. Matar
*Assistant Examiner*—Chuong Ho
*Attorney, Agent, or Firm*—Fleit, Kain, Gibbons, Gutman & Bongini P.L.

[57] ABSTRACT

In a communication network comprising at least one communication medium and a plurality of nodes, each node having a unique identifier associated therewith that is transmitted as part of each message transmitted by said node, a method for transmitting signals includes the following steps performed at a first node:

(a) determining that a message is to be sent;
(b) determining whether the communication medium is available for transmission of the message;
(c) determining whether at least a second node is also attempting to transmit during a time period;
(d) if at least a second node is also attempting to transmit during the time period, comparing the unique identifier of the first node with the unique identifier for the second node;
(e) determining a transmission priority order based on said comparison; and
(f) waiting for the second node to finish transmitting in the case that the second node has a higher priority than the first node.

12 Claims, 2 Drawing Sheets

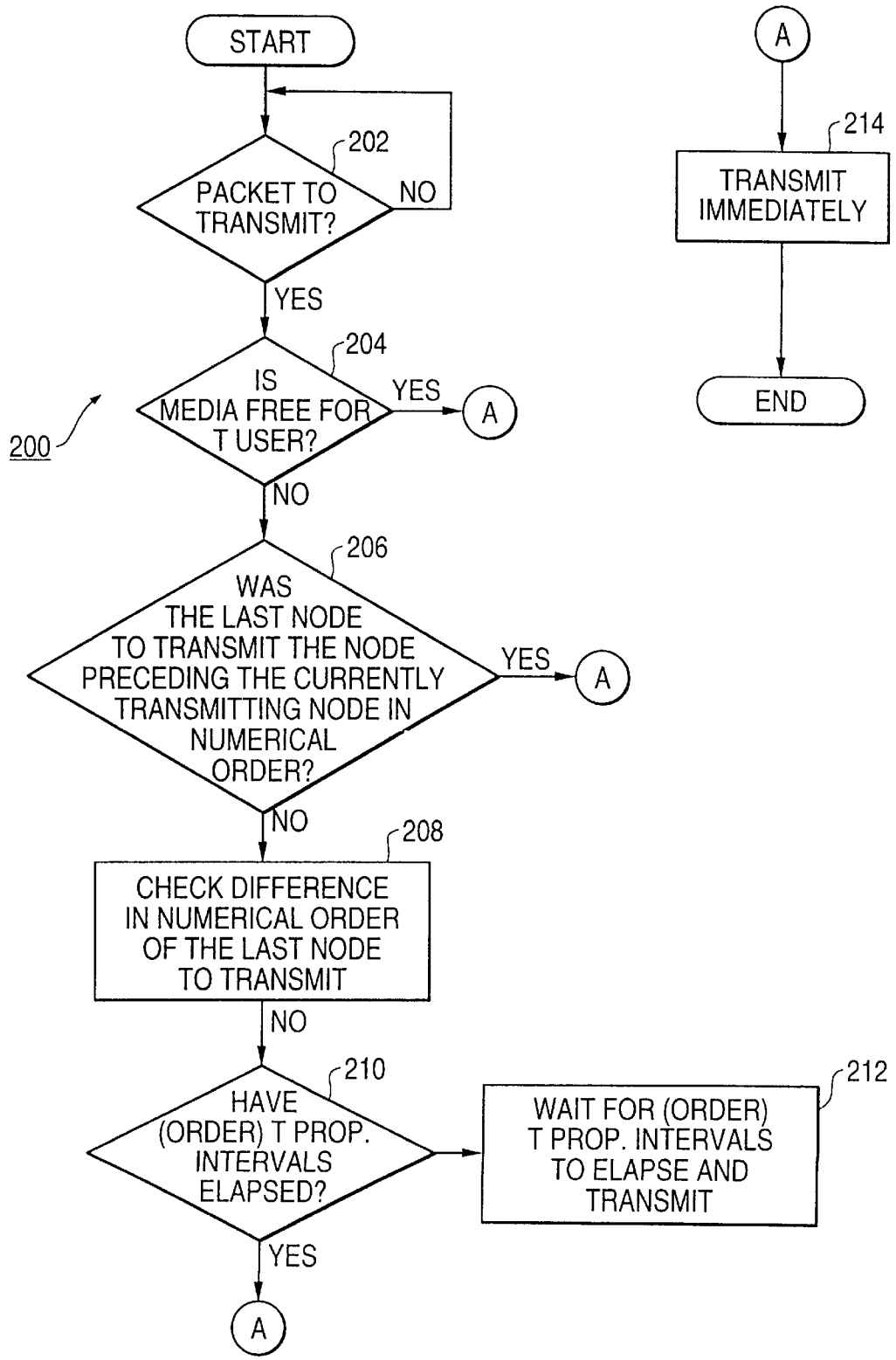

APPARATUS AND METHOD FOR ORDERED TRANSMISSION ON NETWORKS

BACKGROUND OF THE INVENTION

The present invention relates to computers and computer networks and more specifically to a system for providing ordered transmission of messages in a computer network.

As personal computers have become a popular communication device for many users worldwide problems have arisen from the competition for network resources and for access to transmission time. One manifestation of this problem occurs when more than one communication unit attempts to transmit a signal over the same communication medium in a network. This results in contention for network resources and collisions among the competing signals.

Examples of networks exhibiting these problems are local area networks (LANs) such as Ethernet networks, metropolitan area networks (MANs), and wide area networks (WANs) such as are often used in the Internet.

There are a number of solutions to these problems in the art. U.S. Pat. No. 5,450,594 relates to enhanced collision detection in an Ethernet network. It offers a solution that is typical in the field in that it assumes that collisions are a given and then tries to provide an improved method for dealing with them. It, as in the cases of many others, does not try to prevent collisions from occurring in the first place.

U.S. Pat. No. 5,668,811 relates to a method of maintaining frame synchronization in a communication network. This is representative of many other subsequent attempted solutions in that it suggests a solution that requires the addition of expensive hardware devices, complicated algorithms and/or costly external devices to the network.

U.S. Pat. No. 4,063,220 (from the original inventors of the Ethernet) relates to a multi point data communication system with collision detection.

Most of the above approaches simply assume that there will be contention and collisions in the network and attempt to work around this accepted limitation. Thus there is a need to solve these problems by avoiding the contention/collision problems in the first place. Such solutions exist but are expensive and complicated.

SUMMARY OF THE INVENTION

Briefly, in accordance with the invention, the above problem is solved in a method and system for communicating in a network that establishes an order for transmissions by communication units within the network by establishing an order for transmission based on a unique identifier for each unit on the network.

BRIEF DESCRIPTION OF THE DRAWING(S)

FIG. 3 is a flow chart showing a method for providing an order for transmissions in a network in accordance with the invention.

DESCRIPTION OF THE ILLUSTRATIVE EMBODIMENT(S)

Figure 1:
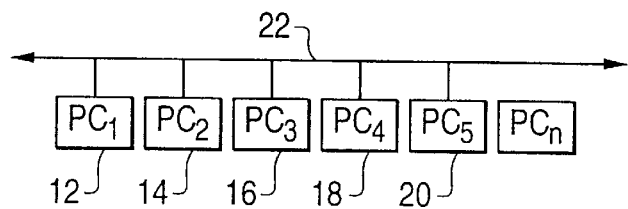
FIG. 1 is a block diagram of a computer system including a message ordering structure in accordance with the present invention.

Referring to FIG. 1, shows a portion of a computer network 10 with a plurality of nodes 12–20. The nodes 12–20 which can be personal computers or any other information processing units capable of communicating in the network 10. In this case each of the units 12–14 has a unique identifier (e.g., an address) that can be represented by a number that is unique within the network and the value of each of these numbers increases from left to right. Each node also includes the ability to keep track of the list of nodes on its network or may even be able to keep track of just the most recently (x seconds) seen node IDs that are immediately preceding it in numerical order. The node could store just one of these IDs but may as well store the preceding three or four for robustness. Alternatively, the IDs and/or transmission order could easily be administratively assigned. The network 10 can be any network in which collision or contention problems can occur. Examples of such networks include the Ethernet and LANs. In accordance with one aspect of the invention, an order for transmission by the units 12–20 is established based on the address of each unit. In networks such as LANs, MANs, and WANs each node is identified by a unique address. Such addresses are represented by a number or an alphanumeric designation that can be expressed as a number. Moreover, most networks have protocols wherein each transmission includes information identifying the transmitting unit or node. In one embodiment, the assigned order would be to grant priority among a plurality of nodes contending for the medium to the unit having the lowest value associated with its address. As an alternative the priority could be granted to unit with the highest value associated with its address or any other predetermined order based on the numeric value of the nodes' addresses.

As an example of an ordered transmission system consider the case where unit 12 transmits first.

In one embodiment of the invention, if a unit or node wants to transmit during its allocated turn to transmit, it does so. If a start-of-frame/preamble is not put on the media within the time limit, then the next node in sequence can transmit. Alternatively, a frame with no data portion could be transmitted as a place holder.

One example of where the invention can be used is in the Ethernet. Each Ethernet node already has a unique node ID. Instead of having each node transmit at random, often resulting in collisions, transmissions could take place in numerical order of node IDs. Every node waits for the node numerically before it to transmit before it commences its own transmission.

Now consider a situation where the first unit 12 transmits. A second node 14 waits for the first to finish (or for T propagation microseconds, whichever comes first). A third node 16 waits for the transmission of the second node 14 to finish (or for T propagation microseconds, whichever comes first). The above process continues in order until the last node has its turn. Then the first can transmit and the sequence starts over from the beginning.

Alternatively, the nodes in the network could transmit as usual and if contention or collisions occur, the network could alternate the waiting period for each of the nodes between small and very small values (e.g, alternate between T propagation and a small multiple of T propagation). The foregoing process can also be used with other types of IDs including other MAC (medium-access control) layer addresses, network addresses, IP addresses.

Figure 2:
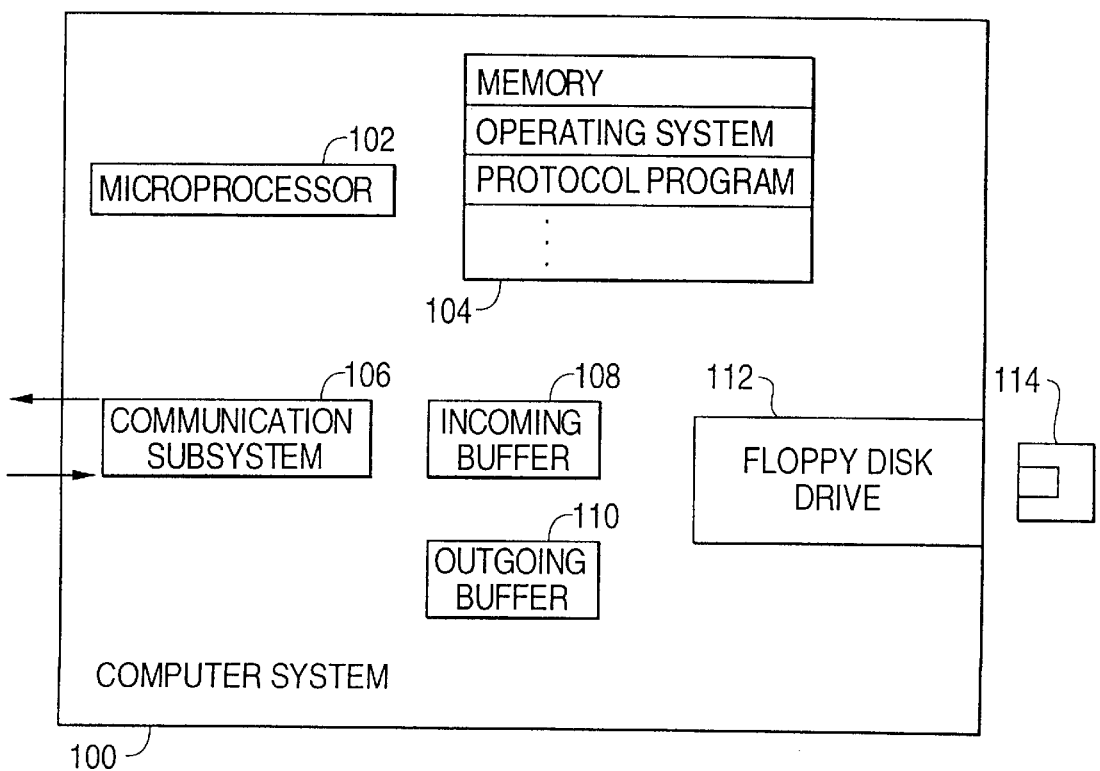
FIG. 2 shows a conceptual structure for a network unit or node embodying the invention.

FIG. 2 shows a conceptual structure for a network unit 100 embodying the invention. Network unit 100 is a microprocessor-powered computer system that represents a typical node in a network utilizing the present invention. The computer system 100 comprises a microprocessor 102, a memory subsystem 104 for storing programs and data, a communication subsystem 106 for providing a communication interface between the computer system 100 and a network comprising other network units, an incoming data buffer for (among other things) holding received information while certain operations are performed with respect to the incoming data, an outgoing buffer 110 for holding outbound data, and a floppy disk drive 112 for receiving information from a diskette 114. The system 100 further comprises other components and connections among its components that are conventional and have been omitted herefrom for ease of discussion.

The memory 104 is shown as storing an operating system, for providing an interface between the system hardware and the applications programs executed therewith, and a protocol program in accordance with the invention for providing a transmission ordering system in accordance with the invention. The memory may further include other software and data. The buffers 108 and 110 can be realized with any memory location under the control of the microprocessor 102. The protocol program comprises the functionality illustrated in FIG. 3 and can also be implemented as ROM-resident instructions or hard-wired logic. It can be received into the system 100 via diskette 114 or via a network connection.

FIG. 3 is a flow chart 200 showing a method for providing an order for transmissions in a network in accordance with the invention. In step 202 a determination is made as to whether a transmission of a packet is desired. This decision can be based on an external command from a user or other node, or a transmission of a packet can be initiated by the node itself based on predetermined criteria. In step 204 a decision is made as to whether the network communication medium (or media) is available for the transmission. The medium is available if it is free or idle for longer than a propagation duration period (T). If the medium is available, the process proceeds to step 214 wherein the packet is transmitted immediately, if desired.

If decision 204 is negative, a decision 206 is made as to whether the last node to transmit is the node preceding the currently transmitting node in numerical order. If the appropriate number of T propagation intervals have elapsed, the node can transmit immediately 214. The appropriate number of T propagation intervals is deemed to be elapsed after the number of propagation periods for the time of transmission by each node ahead in the order has elapsed.

If decision 206 is negative, in step 208 the node seeking to transmit determines the difference in numerical order of the last node to transmit. A decision 210 is then made as to whether the appropriate number of propagation delays have lapsed. If the decision 210 is negative, the node seeking to transmit waits for the appropriate number of propagation delays and then transmits 214 in the system order.

In another embodiment, if the medium is idle, the node with a pending transmission may transmit.

Alternately, nodes could have an order that is a multiple of their number (for example k) in the assigned order.

Alternately, nodes could have a transmission order that alternates between their number (for example k) and the number of nodes (for example n) on this transmission medium.

Alternately, nodes could have a transmission order that alternates between their number (for example k) and the number of nodes (for example n) on this transmission medium minus the node's number in the order (for example n−k).

Alternately, nodes could have an order that uses the above to alternate the seed to the exponential function that is commonly used in networks such as Ethernet between their number (for example k) and the number of nodes (for example n) on this transmission medium minus the node's number in the order (for example n−k).

This would avoid contention because no two nodes would have the same position in the transmission order. Also, if desired it could provide for fairness with respect to network access. This is because, a node with a small number for k, could then alternate to the larger number (n−k). Correspondingly a node that had a larger number for K, would alternate to the much smaller number (n−K).

In the above, it may also be useful to add a small positive (or negative) constant factor c to the values. So, for example, the waiting time becomes (n+c)−k. Or the seeded exponential function becomes e∧(n+c)−k.

It is also possible to use an ordered transmission method wherein the (terminal or intermediate) receiver(s) or relaying node(s), routers, switches, or other networking devices can have information identifying the source, sender, receiver, destination, stream, flow, or packet without examination of the header, or node, ID, or contents therein etc.

While the invention has been illustrated in connection with a preferred embodiment, it will be understood that many variations will occur to those of ordinary skill in the art, and that the scope of the invention is defined only by the claims appended hereto and equivalents.

What is claimed is:

1. In a communication network comprising at least one communication medium and a plurality of nodes, each node having a unique identifier associated therewith that is transmitted as part of each message transmitted by said node, a method for transmitting signals comprising the steps of:

at a first node:
 (a) determining that a message is to be sent;
 (b) determining whether the communication medium is available for at least a period of time that is longer than a time required for the transmission of the message;
 (c) determining whether at least a second node is also attempting to transmit during a time period;
 (d) if at least a second node is also attempting to transmit during the time period, comparing the unique identifier of the first node with the unique identifier for the second node;
 (e) determining a transmission priority order based on said comparison; and
 (f) waiting for the second node to finish transmitting in the case that the second node has a higher priority than the first node.

2. The method of claim 1 further comprising the step of:
 (b1) if the communication medium is not available, waiting for the earlier of the end of the transmission detected and the propagation delay for the communication medium.

3. The method of claim 1 further comprising the steps of:
 (d1) determining a number based on the unique identifier of the second node; and
 (d2) comparing the number for the second node with a number associated with the unique identifier of the first node.

4. The method of claim 1 wherein the messages transmitted in the network are packet-based.

5. The method of claim 1 wherein the time period of step (c) is any length of time overlapping with a transmission period for the network during which the first unit is presently seeking to transmit.

6. A computer program product for providing an order for transmission of messages in a communication network, said computer program product comprising:

a computer readable information storage medium;

program instruction means for determining that a message is to be sent;

program instruction means for determining whether the communication medium is available for at least a period of time that is longer than a time required for transmission of the message;

program instruction means for determining whether at least a second node is also attempting to transmit during a time period;

program instruction means for comparing the unique identifier of the first node with the unique identifier for the second node, when at least a second node is also attempting to transmit during the time period;

program instruction means for determining a transmission priority order based on said comparison; and program instruction means for waiting for the second node to finish transmitting in the case that the second node has a higher priority than the first node.

7. The computer program product of claim 6 further comprising program:

(b1) if the communication medium is not available, waiting for the earlier of the end of the transmission detected and the propagation delay for the communication medium.

8. The computer program product of claim 6 further wherein the instruction for comparing the unique identifiers comprises instructions for:

determining a number based on the unique identifier of the second node; and comparing the number for the second node with a number associated with the unique identifier of the first node.

9. The computer program product of claim 6 wherein the messages transmitted in the network are packet-based.

10. The computer program product of claim 1 wherein the time period of the instruction for comparing is any length of time overlapping with a transmission period for the network during which the first unit is presently seeking to transmit.

11. In a data communication network comprising a communication medium and a plurality of nodes, a node comprising an information handling system comprising:

means for determining whether at least one data packet is to be transmitted via the communication medium;

means for determining whether the communication medium is available for at least a period of time that is longer than a time required for transmitting the at least one data packet;

means for determining whether a data packet being transmitted was sent by network unit having a higher priority based on its identifier value;

a timer for holding transmission of the at least one data packet for a length of time corresponding to at least one propagation period for each data packet being transmitted by a network unit having a greater priority; and a transmitter for transmitting information packets when the length of time that the data packet is held by the timer lapses.

12. A computer program product for providing an order for transmission of messages in a communication network, said computer program product comprising:

a computer readable information storage medium;

first program instruction means for determining that a message is to be sent;

second program instruction means for determining whether the communication medium is available for at least a period of time that is longer than a time required for transmission of the message;

third if the communication medium is not available, waiting for the earlier of the end of the transmission detected and the propagation delay for the communication medium;

fourth program instruction means for determining whether at least a second node is also attempting to transmit at the same time;

fifth program instruction means for determining a number based on the address of the second node;

sixth program instruction means for comparing the number for the second node with a number associated with the first node;

seventh program instruction means for waiting for the second node to finish transmitting in the case that the number of other node has a lower value that of the first node.

* * * * *